(12) United States Patent
Cloetens

(10) Patent No.: US 6,801,142 B2
(45) Date of Patent: Oct. 5, 2004

(54) METHOD AND DEVICE FOR DETECTING BITS IN A DATA SIGNAL

(75) Inventor: Henry Cloetens, Leuven (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 56 days.

(21) Appl. No.: 10/376,217

(22) Filed: Feb. 27, 2003

(65) Prior Publication Data

US 2004/0027262 A1 Feb. 12, 2004

(Under 37 CFR 1.47)

Related U.S. Application Data

(62) Division of application No. 09/157,914, filed on Sep. 21, 1998, now abandoned.

(30) Foreign Application Priority Data

Sep. 30, 1997 (EP) .............................. 97203008

(51) Int. Cl.⁷ ................................................ H03M 7/00
(52) U.S. Cl. .......................... 341/61; 341/141; 341/155
(58) Field of Search ........................... 341/61, 141, 155

(56) References Cited

U.S. PATENT DOCUMENTS

| | | | | |
|---|---|---|---|---|
| 3,996,456 A | * | 12/1976 | Hoover | 708/801 |
| 4,636,972 A | * | 1/1987 | Boland | 708/321 |
| 4,912,729 A | * | 3/1990 | Van Rens et al. | 375/327 |
| 5,717,618 A | * | 2/1998 | Menkhoff et al. | 708/313 |
| 6,084,924 A | * | 7/2000 | Melas | 375/340 |
| 6,370,502 B1 | * | 4/2002 | Wu et al. | 704/230 |

* cited by examiner

Primary Examiner—Peguy JeanPierre
(74) Attorney, Agent, or Firm—Michael E. Belk

(57) ABSTRACT

A method and device are described for detecting bits in a read signal sampled at a system clock frequency which deviates from the bit frequency. A series of bit-frequency relevant signal values ($B_{1,2}$) is computed from the series of system clock frequency-measured sample values ($B_1$, $B_2$, . . . ) as a convolution of the measured sample values having a function centered around the desired sampling instant, which function is the Fourier transform of a predetermined pulse response of the sampling procedure. This pulse response is chosen to be such that the sampling procedure is reliable for bit frequencies up to twice the system clock frequency. To be able to process such high bit frequencies in actual practice, a bit detector (320) according to the invention has two data outputs (321, 322) and one validity output (225). Whenever a computation has been finished, a pulse is supplied at the validity output whose frequency may be maximally equal to the system clock frequency. Per validity pulse, the bit detector can supply two sample values simultaneously at its two data outputs.

17 Claims, 11 Drawing Sheets

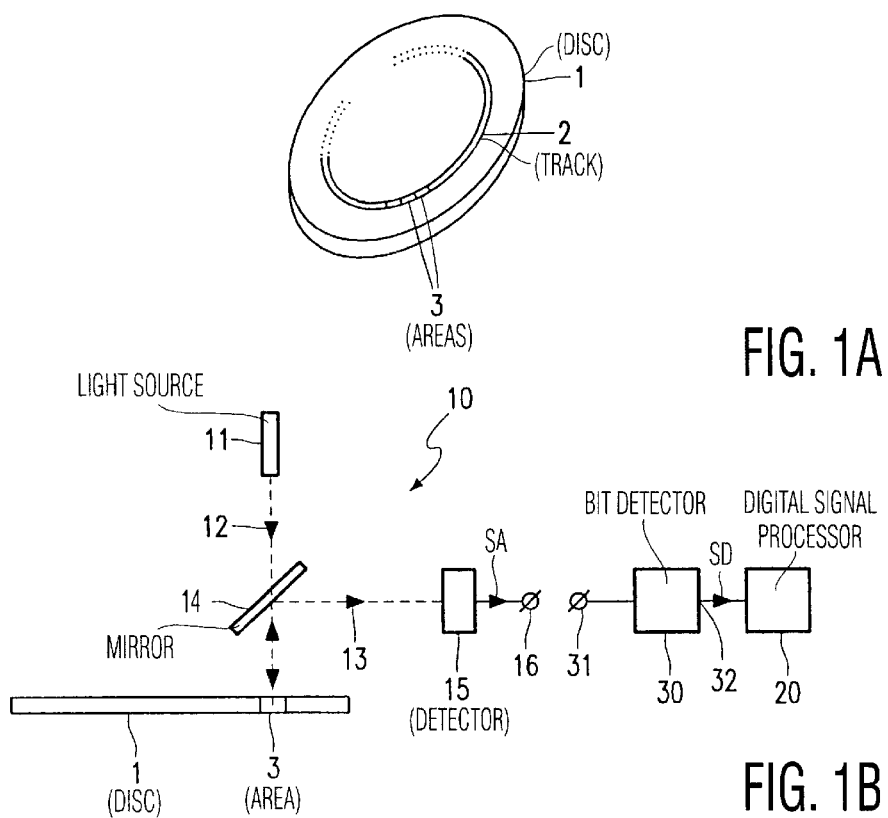
FIG. 1A
FIG. 1B
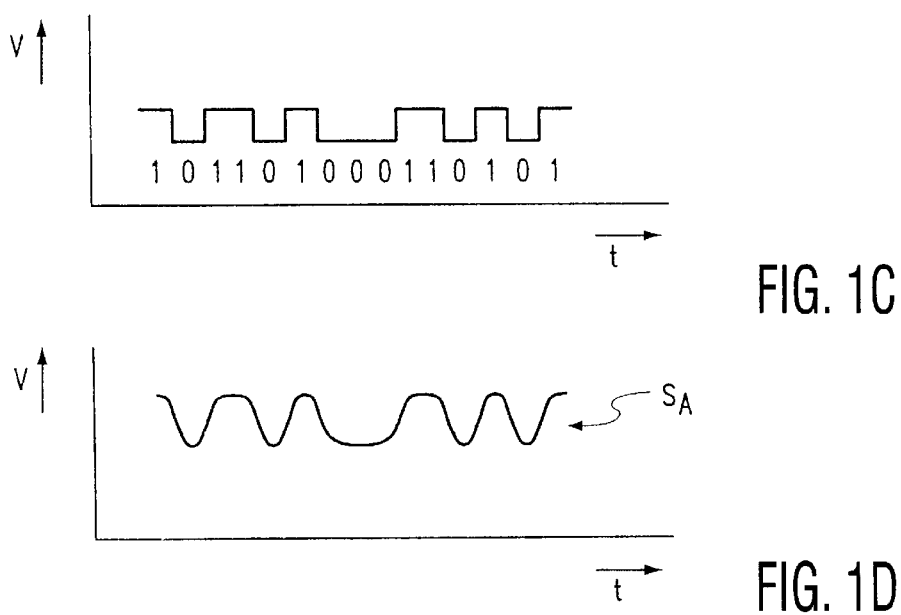
FIG. 1C
FIG. 1D

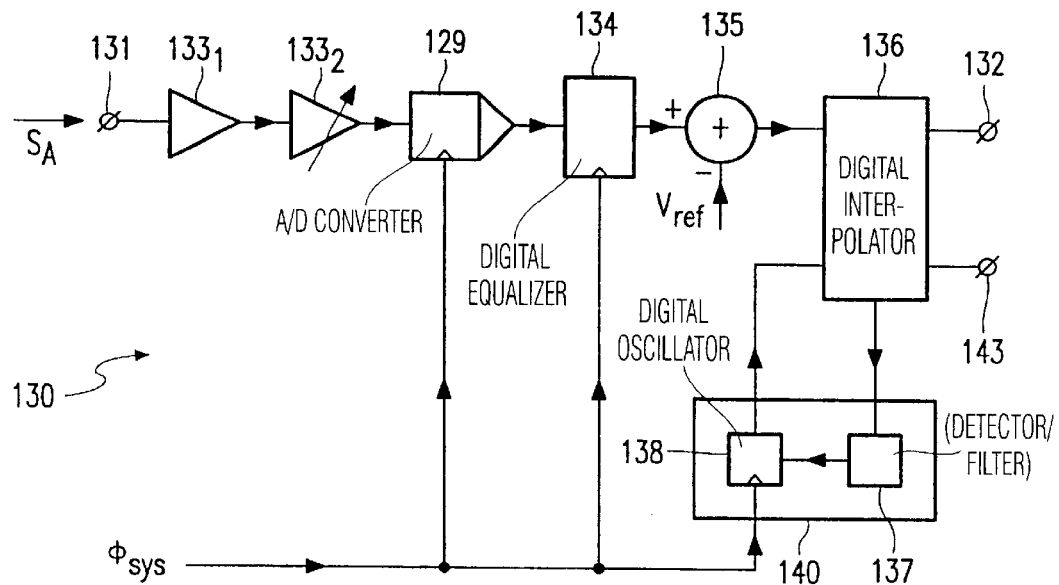
FIG. 3A
FIG. 3B
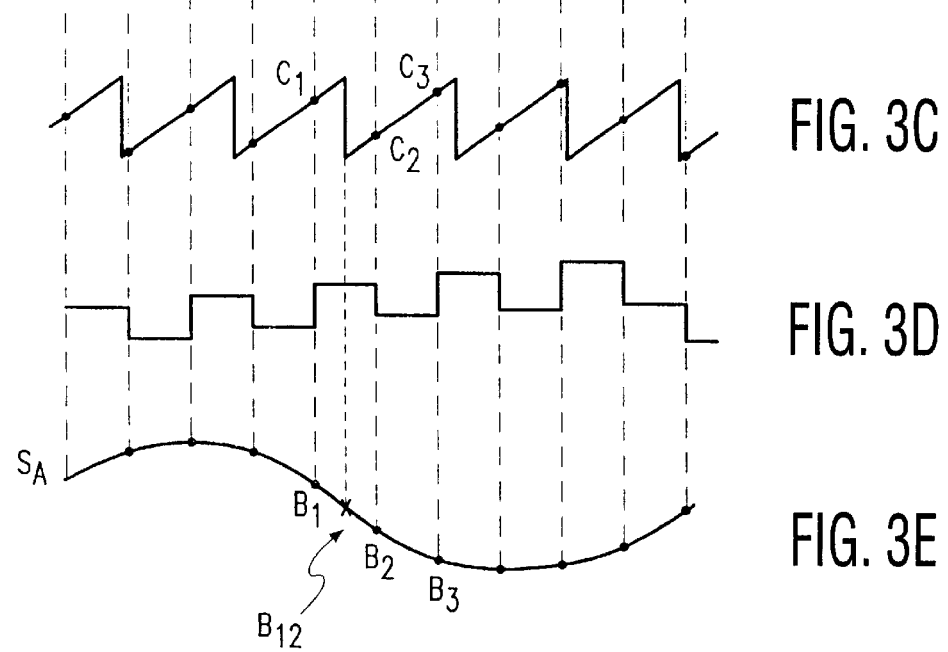
FIG. 3C
FIG. 3D
FIG. 3E

 $\phi_{sys}$ FIG. 11A
 $S_A$ FIG. 11B

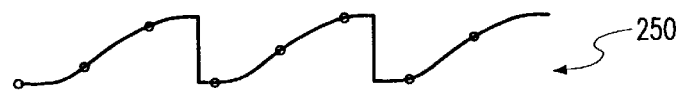 250 FIG. 11D
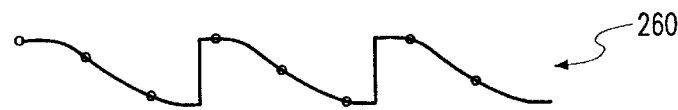 260 FIG. 11E

METHOD AND DEVICE FOR DETECTING BITS IN A DATA SIGNAL

CROSS REFERENCE TO RELATED APPLICATIONS

This is a divisional of application Ser. No. 09/157,914, filed Sep. 21, 1998, allowed Nov. 27, 2002 now abandoned.

BACKGROUND AND SUMMARY OF THE INVENTION

The invention generally relates to processing a read signal as obtained during reading a carrier with information recorded in a digital form, which read signal is representative of the recorded information.

More particularly, the invention relates to a method as described in the introductory part of claim 1. Such a method is known from U.S. Pat. No. 4,912,729.

The information recorded in a digital form may be intrinsic digital information (data), or digitized analog information such as, for example, audio or video. The information may be recorded by means of an arbitrary technique, for example, magnetic or optical recording, on a record carrier having an arbitrary suitable shape, for example, a tape or a disc, as are known per se, for which reason this will not be further explained. More particularly, the invention relates to reading a CD and hence to EFM, EFMPLUS and related modulation techniques.

As is known, information recorded in a digital form generally has the character of a sequential series of information units which are denoted as "bits" and which, in principle, may assume two logic values denoted as "0" and "1". In a practical sense, the actual recording of these two values takes place in the form of a physical parameter such as, for example magnetization direction or optical reflection. When the information is read from the record carrier, use is made of a suitable read member such as, for example a magnetic or optical read head, which read member provides an analog electric read signal which is indicative of the read values of this relevant parameter. The read member is usually active continuously, and the read signal provided by the read member usually has a continuous character, considered with respect to time, which read signal can, in principle, assume only two signal levels. Theoretically, the read signal thus has the shape of a square-wave signal with straight edges. In practice, the read signal will have a smoother variation between these two signal levels as extreme values. This read signal will hereinafter be referred to as "analog read signal".

It is to be noted that the read signal may not be a continuous signal but a time-discrete signal, as will be evident to those skilled in the art.

For the ultimate digital processing in a read apparatus, the analog read signal must be converted into a digital signal. To this end, a signal-processing member of the read apparatus has an input stage with a bit detector which converts the analog read signal into a digital signal which comprises the separate consecutive bits, i.e. a series of zeros and ones. A primary task of the bit detector is to render the value of the read signal discrete, i.e. to provide a signal which can assume two values only, which values are denoted by 0 and 1. This discrete signal, which will hereinafter be referred to as "digital signal", may be a time-continuous signal, but it may also be a time-discrete signal, i.e. a signal having a valid value only at predetermined, equidistant instants; such a signal is denoted as "bit stream signal". The principle of operation of a bit detector is based on sampling the analog read signal at predetermined sampling instants; in this respect, a bit detector is comparable with an A/D converter.

A bit detector may be realized with analog components. However, there is a need for digital bit detectors, i.e. bit detectors realized with digital components. An example of a digital bit detector is described in U.S. Pat. No. 4,912,729.

A problem with digital bit detectors is that the sampling frequency and the sampling instants are determined by a system clock signal whose frequency is not coupled to the bit frequency. This means that the actual sampling instants generally do not coincide with the desired, bit-synchronous sampling instants and that, generally, the measured sampling values are not directly usable. More particularly, a new series of bit-frequency arithmetic values must be derived from the series of measured sampling values, which arithmetic values at least approximately correspond to the values which would have been measured if the read signal had actually been sampled at the desired bit-synchronous sampling instants.

For this purpose, a linear interpolation method is described in said publication, in which method the phase of the actual sampling instants relating to the desired sampling instants is determined and in which an arithmetic value associated with a given desired sampling instant is computed by linear interpolation between two sampling values measured on either side of said given desired sampling instant, taking said phase into account.

However, linear interpolation has a limited accuracy.

Moreover, known digital bit detectors have the drawback that the sampling frequency must be larger than the bit frequency. At large bit frequencies, the system clock frequency required for such a known bit detector would have to be proportionally larger. However, sampling of the read signal at such high frequencies, and performing said linear interpolation method at such high frequencies, become more and more difficult and expensive as these frequencies increase. A further drawback of this known method is that the occurring error becomes larger at larger bit frequencies.

It is a general object of the present invention to obviate these drawbacks.

An important object of the present invention is to provide a digital bit detector which can be operated at a system clock frequency which is lower than the bit frequency. Another important object of the present invention is to provide a method and device for deriving, from a series of actual sampling values having a first frequency, a series of arithmetic values having a second frequency, which second frequency is higher than the first frequency.

In accordance with an important aspect of the present invention, an arithmetic value is computed from the measured sampling values by computing the convolution of the measured sampling values with a function which is centered around the desired sampling instant and is the Fourier-transform of a predetermined pulse response of the sampling filter.

These and other aspects of the invention are apparent from and will be elucidated with reference to the embodiments described hereinafter.

BRIEF DESCRIPTION OF THE DRAWINGS

In the drawings:

FIGS. 1A–D illustrate diagrammatically how information is read from a record carrier;

FIG. 3A is a block diagram of a known digital bit detector;

FIG. 3B illustrates system clock signal $\phi_{sys}$ in FIG. 3A.;

FIG. 3C shows an analog sawtooth signal in 3A that is comparable with oscillator signal $\phi_{osc}$ of FIG. 2B;

FIG. 3D shows the output signal of the digital oscillator of FIG. 3A;

FIG. 3E shows the analog read signal $S_A$ in FIG. 2B;

DETAILED DESCRIPTION

Figure 2A:
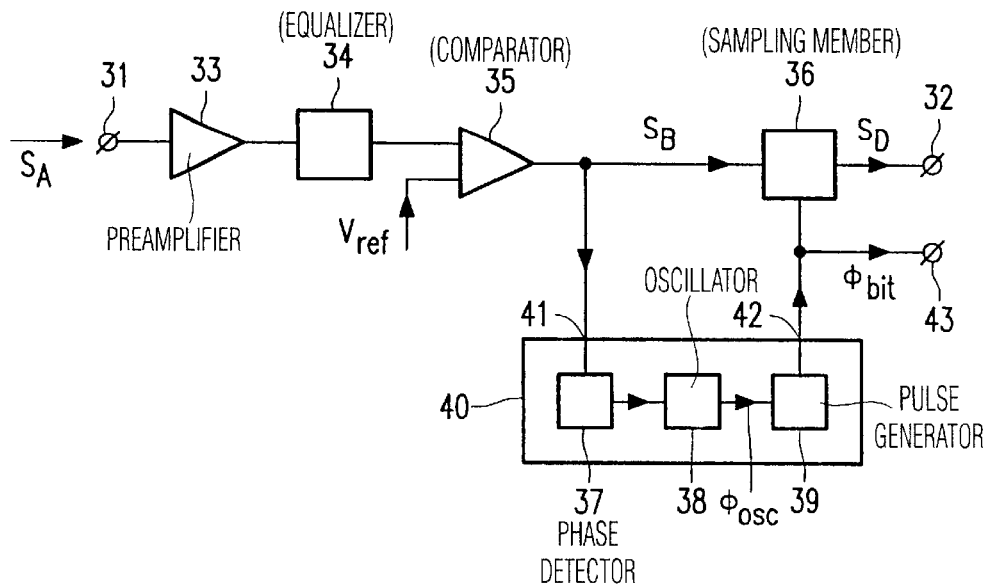
FIG. 2A is a block diagram of an analog bit detector.

FIG. 1A is a perspective elevational view of an optical disc 1 as an example of a medium for recording digital information. The disc 1 has a multitude of tracks 2 in which consecutive areas 3 are defined, a reflection coefficient of which is indicative of a logic "1" or "0". Each of these areas 3 represents an information unit (bit).

FIG. 1B is a side-elevational view of the disc 1 in a device 10 for reading the information recorded on the disc 1. A light source 11, usually a laser, generates a narrow light beam 12 which is directed towards the surface of the disc 1. The light 13 reflected by the disc 1 is directed via a partially reflecting mirror 14 to an optical detector 15, an output 16 of which supplies an analog electric read signal $S_A$ which is representative of the quantity of light received by the detector 15. The disc 1 is rotated by a table (not shown) so that the light beam 12 scans the track 2 of the disc 1. When the light beam 12 is incident on an area 3 with a relatively high reflection coefficient, the analog read signal $S_A$ supplied at the output 16 of the detector 15 has a relatively high voltage level; when the light beam 12 impinges upon an area 3 with a relatively low reflection coefficient, the analog read signal $S_A$ supplied at the output 16 of the detector 15 has a relatively low voltage level.

Since the physical nature of recording data on the record carrier 1 is not the subject of the present invention and since knowledge thereof for understanding the present invention is not necessary for those skilled in the art, it will not be further described. The same applies to the nature and construction of the means for reading the data and providing the electric signal $S_A$.

Considered with respect to time, the electric signal $S_A$ supplied at the output 16 of the detector 15 is a continuous, analog signal which has either a relatively high voltage level or a relatively low voltage level at any arbitrary instant, because each area 3 of the track 2 has either a relatively high reflection coefficient or a relatively low reflection coefficient. Theoretically, the continuous analog signal $S_A$ is thus a square-wave-shaped signal with straight edges, as is illustrated in FIG. 1C. In practice, the analog signal $S_A$ has a more rounded shape, as is illustrated in FIG. 1D.

The analog electric read signal $S_A$ is indicative of the values of the consecutive bits in the track 2. FIGS. 1C and 1D show examples of an electric read signal $S_A$ which is indicative of a bit series 101101000110101. To enable a digital signal processor 20 to process the digital contents of the analog electric read signal $S_A$ digitally, a bit detector 30 should be provided which is adapted to receive, at its input 31, the analog electric read signal $S_A$ from the detector 15 and supply, at its output 32, a digital data signal $S_D$. This digital data signal $S_D$ may be a time-continuous or time-discrete signal.

In the configuration of FIG. 1B illustrated by way of example, the bit detector 30 is associated with the signal processor 20. However, it is alternatively possible to associate the bit detector 30 with the detector 15, i.e. the detector 15 supplies the signal $S_D$. The bit detector 30 may of course also be a separate component.

FIG. 2A is a block diagram of a possible realization of an analog bit detector 30 illustrating the principles of bit detection. The analog electric read signal $S_A$ is passed via a preamplifier 33 and an equalizer 34 from the input 31 to a first input of a comparator 35. A second input of the comparator 35 is connected to a reference voltage $V_{ref}$ whose level is also indicated by the term "slice level". The preamplifier 33 is used for adapting the dynamic range. The equalizer 34 is a filter which is used to increase the eye opening. The comparator 35 is used to render the (adapted) read signal $S_A$ discrete. The discrete output signal $S_B$ from the comparator 35 is bit-frequency sampled by a sampling member 36 which may be a flipflop. The desired bit-frequency sampling instants are determined by a bit clock detector 40 which derives a bit clock signal $\phi_{bit}$ from the discrete signal $S_B$ received at its input 41.

Figure 2B:
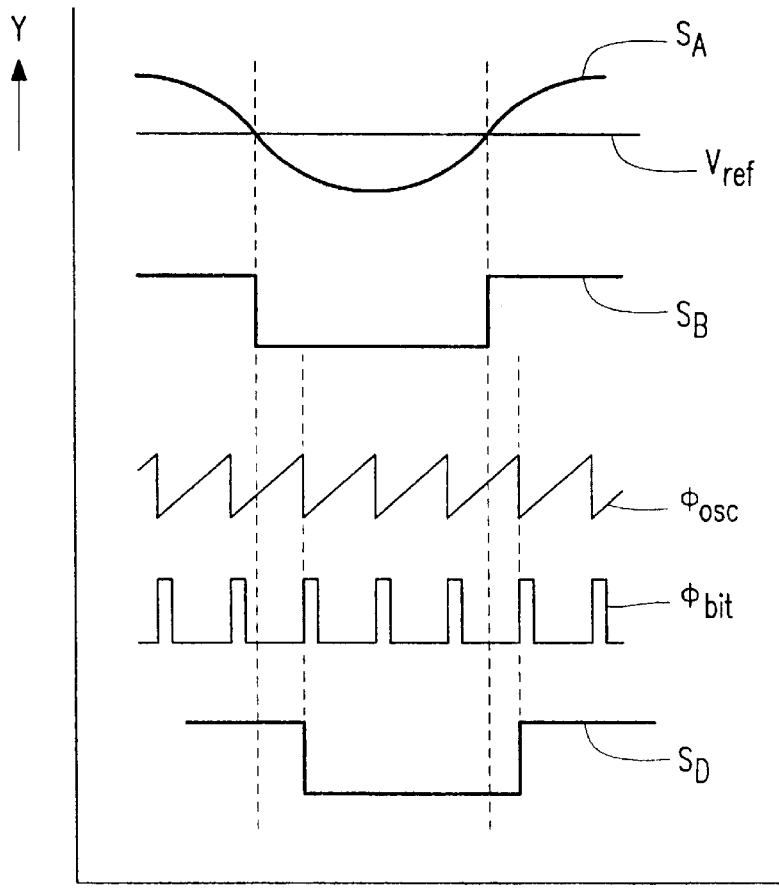
FIG. 2B illustrates the principle of operation of an analog bit detector.

FIG. 2B shows diagrammatically the square-wave analog read signal $S_A$ as is present at the first input of the comparator 35, and the reference voltage $V_{ref}$ applied to the second input of the comparator 35. The output of the comparator 35 supplies a square-wave signal $S_B$ which is HIGH when the square-wave analog read signal $S_A$ has a higher instantaneous value than the level of the reference voltage $V_{ref}$, and is LOW when the square-wave analog read signal $S_A$ has a smaller instantaneous value than the level of the reference voltage $V_{ref}$.

The sampling member 36 has a signal input which is connected to the output of the comparator 35 for receiving the square-wave signal $S_B$, and an output which is connected to the output 32 of the bit detector 30 for supplying the digital data signal $S_D$. The sampling member 36 also has a clock input which is connected to the output 42 of the bit clock detector 40 for receiving the bit clock signal $\phi_{bit}$. Whenever the sampling member 36 receives a pulse of the bit clock signal $\phi_{bit}$ at its clock input, the output of the sampling member 36 assumes the value of the square-wave signal $S_B$ present at that instant at its signal input, and this value is retained until a new pulse of the bit clock signal $\phi_{bit}$ is received. For further processing members, the bit clock signal $\phi_{bit}$ may also be supplied at a bit clock output 43 of the bit detector 30.

As is shown, the bit clock detector 40 may be implemented as a phase-locked loop (PLL), and comprises a voltage-controlled oscillator 38 which is driven by a phase detector 37 receiving the square-wave signal $S_B$. The phase detector 37 comprises a loop filter. An output of the oscillator 38 is connected to an input of a pulse generator 39 which generates a pulse of the bit clock signal $\phi_{bit}$ once per oscillation period.

The oscillator 38 is usually implemented as a sawtooth generator, and the output signal $\phi_{osc}$ of the oscillator 38 has a sawtooth shape which increases uniformly from a minimum value to a maximum value and decreases (stepwise) within a very short time to the minimum value, as is also illustrated in FIG. 2B. The pulse generator 39 is triggered at the negative edges of the oscillator signal $\phi_{osc}$ (which is indicated as phase=0), and supplies pulses having a width which is smaller than the period of the oscillator signal $\phi_{osc}$, as is also illustrated in FIG. 2B. Finally, the output signal $S_D$ of the sampling member 36 is illustrated in FIG. 2C.

It is to be noted that the sampling member 36 in the example shown may be alternatively triggered by the negative edges of the oscillator signal In addition to a good accuracy and a low noise of said components, the bit detector 30 is required to handle a bit frequency which is as high as possible.

Although the principle of digitization discussed in the foregoing with reference to FIGS. 2A and 2B also applies if the bit detector is implemented with digital components, a digital realization involves the problem that the components are not continuously active but only at fixed instants which are defined by a clock signal, as will be explained hereinafter.

FIG. 3A is a block diagram of a digital bit detector 130. The structure of this digital bit detector 130 is roughly comparable to that of the analog bit detector 30 described hereinbefore, and comparable components are denoted by a reference numeral raised by 100. This structure will therefore be discussed briefly hereinafter.

The analog electric read signal $S_A$ reaches a digital A/D converter 129 via two preamplifiers $133_1$ and $133_2$, in which the gain factor of the second preamplifier $133_2$ is programmable (adjustable). The output signal of the digital A/D converter 129 reaches a positive input of a digital difference generator 135 via a digital equalizer 134. The difference generator 135 receives the reference voltage $V_{ref}$ at a negative input and applies the difference signal to a digital interpolator 136 in which the ultimate bit detection is performed. The interpolator 136 has a first output 132 for providing the detected bits, and a second output 143 for supplying bit pulses, i.e. one pulse for each detected bit. In other words, the signal supplied at the second output 143 corresponds to the bit clock signal $\phi_{bit}$ described hereinbefore.

The interpolator 136 is connected to a bit clock detector 140 which comprises a digital phase detector/loop filter combination 137 and a digital oscillator 138.

An important aspect of a digital circuit, such as the digital bit detector 130, is that the different components thereof are triggered by an independent system clock signal $\phi_{sys}$, i.e. a system clock signal which is not derived from the bit signal.

The system clock signal $\phi_{sys}$ is generally a symmetric square-wave signal, as is shown in FIG. 3B, and the different components are triggered on the rising edges of the system clock signal $\phi_{sys}$. More particularly, a (valid) output signal of a component will only change its value at a trigger instant, and the output signals will remain fixed during the period between the trigger instants. FIGS. 3C and 3D illustrate the effect thereof for the output signal of the digital oscillator 138, and FIG. 3E illustrates the effect for the output signal of the digital A/D converter 129.

FIG. 3C shows an analog sawtooth signal which is comparable with the oscillator signal $\phi_{osc}$ of FIG. 2B. Open circles denote the instantaneous voltage levels of this sawtooth signal at the trigger instants of the system clock signal $\phi_{sys}$.

FIG. 3D shows the actual output signal of the digital oscillator 138 in the example illustrated in FIG. 3C: at a trigger instant, the output signal is rendered equal to the instantaneous voltage level, denoted by an open circle, of said sawtooth signal, whereafter the output signal remains constant until the next trigger instant.

In the foregoing description of an analog bit detector, it has been stated that the negative edges of the sawtooth signal $\phi_{osc}$ may be considered as a bit clock signal. However, it will be evident that it is not easy to recognize a bit clock signal in the actual output signal of the digital oscillator 138.

FIG. 3E shows diagrammatically the analog read signal $S_A$, in which again open circles denote the signal values $B_1$, $B_2$, $B_3$, etc., of the analog read signal $S_A$ at the trigger instants determined by the system clock $\phi_{sys}$. Since the digital A/D converter 129 is triggered by the system clock signal $\phi_{sys}$, which determines the instants when the A/D converter 129 samples the analog read signal $S_A$, the digital A/D converter 129 can only supply the series of signal values $B_1$, $B_2$, $B_3$, etc. at its output; these signal values will hereinafter be referred to as "measured sample values".

FIG. 3E also shows that the signal values of the analog signal $S_A$ which are important for constructing the digital data signal and are defined by the flyback instants (phase=0) of the oscillator signal, and hereinafter also referred to as "relevant signal values", usually do not coincide with the actually measured sample values $B_1$, $B_2$, $B_3$, etc. For example, a relevant signal value $B_{12}$ is shown between said signal values $B_1$ and $B_2$.

This problem has already been recognized in existing digital bit detectors. A known solution to this problem is to compute an interpolation value $I_{12}$ which approximates the relevant signal value $B_{12}$. In other words, a straight interpolation line is drawn between the sample values $B_1$ and $B_2$. On the basis of the corresponding sampled clock signal values $C_1$, $C_2$, $C_3$, etc. an estimate is made of the respective phases of the respective sample instants. It is estimated therefrom which instants correspond to phase=0, and the corresponding position on said interpolation line defines the interpolation value $I_{12}$ An example of this known interpolation method is described in U.S. Pat. No. 4,912,729.

This known interpolation method has different drawbacks. At a relatively small system clock frequency, the distance between the sample values $B_1$, $B_2$, etc. is relatively large so that the deviation from the interpolation line with respect to the analog read signal $S_A$ is relatively large, which implies that the interpolation error is relatively large. Likewise it holds that the interpolation error becomes larger as the bit frequency increases. More particularly, it has been found from measurements that this known interpolation method is only reliable if the frequency of the system clock is minimally 95% of the bit frequency. In practice, this means at a fixed value of the system clock frequency that the maximum value of the bit frequency is limited to smaller than the frequency of the system clock. Conversely, if it is desired to process a signal having a high bit frequency, the frequency of the system clock must be chosen to be larger than the bit frequency.

Figure 5:
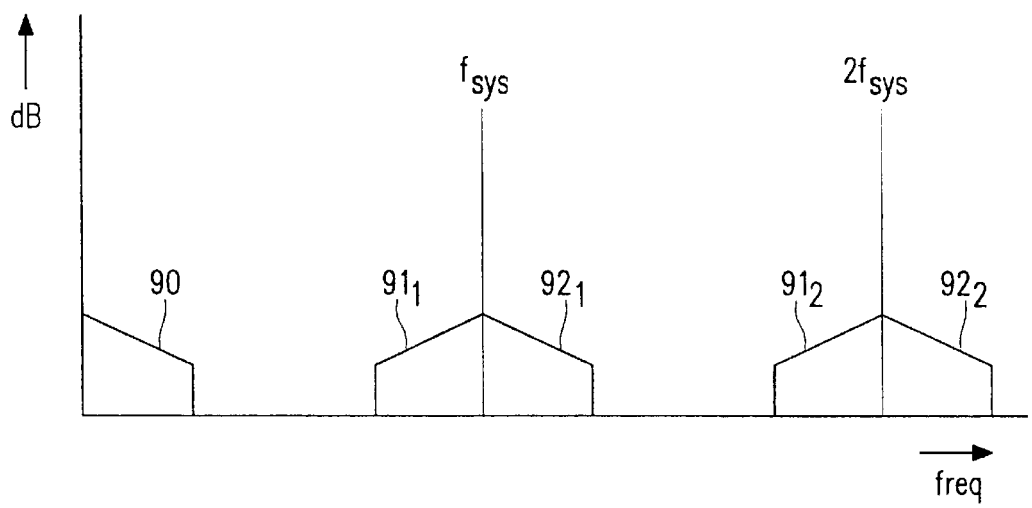
FIG. 5 shows diagrammatically the frequency spectrum of an analog data signal after A/D conversion.

A short explanation will hereinafter be given for the failure of the known interpolation method at relatively high bit clock frequencies by investigating, with reference to FIGS. 5–7, the influence of the interpolation method on the frequency spectrum. FIG. 5 shows diagrammatically the frequency spectrum of the output signal of the A/D converter 129, with the frequency of the HF EFM signal after A/D conversion being plotted horizontally. The frequency spectrum of the original read signal $S_A$ is denoted by the term "baseband" and is shown at 90 in FIG. 5. Due to the time-discrete sampling of the read signal $S_A$, the output signal of the A/D converter 129 has frequency bands $91_1$, $92_1$, $91_2$, $92_2$, etc. on either side of the frequencies $f_{sys}$, $2f_{sys}$, etc., which bands have the same shape as the baseband. Here, $f_{sys}$ is the frequency of the system clock signal $\phi_{sys}$ with which the A/D converter 129 is triggered. Said frequency bands will hereinafter be referred to as "mirror bands".

Figure 6:
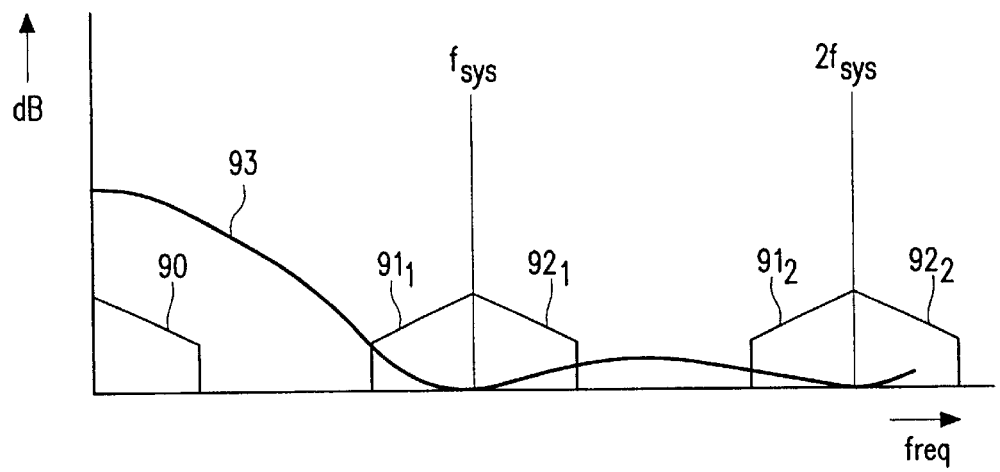
FIG. 6 shows the comparison between the frequency characteristic of a known digital bit detector and the frequency spectrum shown in FIG. 5.

FIG. 6 is a Figure comparable with FIG. 5 in which the performance of the interpolation method known from U.S. Pat. No. 4,912,729 is illustrated. It is known from literature that finding the relevant signal values $B_{12}$ with the aid of a linear interpolation is equivalent to filtering in the frequency domain with a SYNC filter $$A = \left(\frac{\sin \pi f}{\pi f}\right)^2$$

The frequency characteristic of this filter is denoted in FIG. 6 by the reference numeral 93. If the interpolation were perfect, the baseband 90 would not be distorted, while the mirror bands 91, 92 etc. would be fully suppressed. The following Table, which states quantitative numbers of the frequency characteristic obtained by means of computation, illustrates the imperfectness of the interpolation.

| frequency [x $F_{sys}$] | baseband attenuation [dB] | mirror band suppression g [dB] |
|---|---|---|
| 0.05 | −0.07 | −51.2 |
| 0.1 | −0.28 | −38.4 |
| 0.15 | −0.64 | −30.7 |
| 0.2 | −1.16 | −25.4 |
| 0.25 | −1.82 | −20.9 |
| 0.3 | −2.65 | −17.4 |
| 0.35 | −3.65 | −14.4 |
| 0.4 | −4.84 | −11.8 |
| 0.45 | −6.23 | −9.7 |
| 0.5 | −7.84 | −7.84 |

It is clearly apparent from FIG. 6 and the Table above that a distortion of the baseband 90 occurs in the known interpolation method: the attenuation is 7.8 dB at a frequency of $0.5.f_{sys}$. It is further clearly apparent from this Figure that the mirror bands $91_1$, $92_1$ and $91_2$, $92_2$ around $f_{sys}$ and $2f_{sys}$, respectively, are suppressed to a relatively small extent when using the known interpolation method.

It has been found by experiment that the interpolation method yields good results in the frequency range up to $f_{sys}$.

It can be shown that, due to properties of the disc medium and the optical system, it holds for CD and DVD that the highest frequency in the baseband 90 is approximately 0.25 times $f_{sys}$. With reference to the Table above, it is concluded therefrom that the interpolation method yields good results as long as the baseband attenuation is roughly less than 1.82 dB and the mirror band suppression is roughly better than 21 dB.

It is an object of the present invention to provide a solution to this problem. Particularly, the present invention has for its object to provide an interpolation filter with a reduced distortion of the baseband and an improved suppression of the mirror bands, and thus to provide a digital bit detector which yields reliable results, even when the bit frequency is much higher than the frequency of the system clock.

More particularly, it is an object of the present invention to provide a digital bit detector which is designed in such a way that it can process bit frequencies up to twice the system clock frequency.

In accordance with an important aspect of the present invention, this object is achieved by designing the bit detector in such a way that its frequency characteristics have a sharper and steeper variation. FIG. 7 illustrates an example of a frequency characteristic, denoted by the reference numeral 94, having the desired properties. This characteristic is flat in the range between 0 and almost $0.5.f_{sys}$; the attenuation is large in the range between slightly more than $0.5.f_{sys}$ to infinite. In a concrete embodiment, the maximum attenuation was approximately 1 dB in the range between 0 and $0.44.f_{sys}$, and the minimum attenuation was 28 dB in the range between $0.56.f_{sys}$ and infinite; the attenuation rapidly increased from 1 to 28 dB in the range between approximately $0.44.f_{sys}$ and approximately $0.56.f_{sys}$. It will be evident that, at such a frequency characteristic, the baseband frequencies may be higher than in the characteristic of FIG. 6 because the baseband distortion caused is much smaller than the distortion caused by means of said known method. More particularly, bit detection with such a frequency characteristic is reliably applicable to frequencies of less than $0.5.f_{sys}$. Since it also holds in this case that the baseband frequencies are smaller than $0.25.f_{bit}$, the limitation follows that $f_{bit}$ must then be smaller than $2f_{sys}$.

It is to be noted that said values of $0.44.f_{sys}$ and −1 dB, and $0.56.f_{sys}$ and −28 dB have only been mentioned by way of example.

Figure 4:
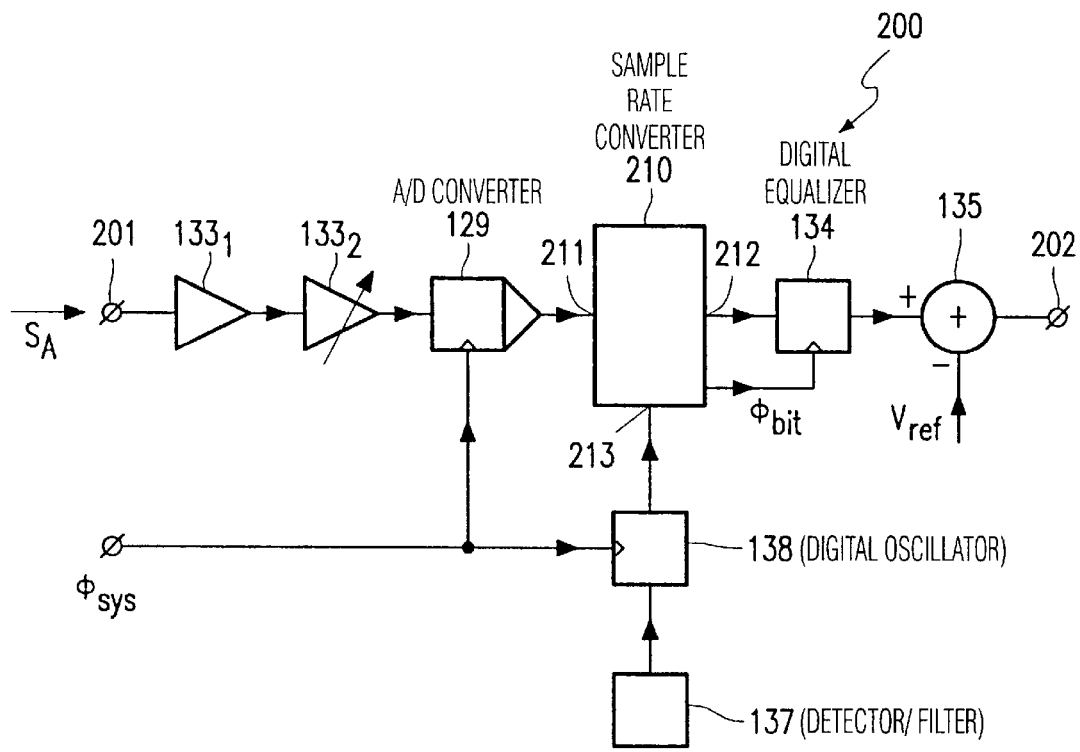
FIG. 4 is a block diagram of a digital bit detector according to the invention.

FIG. 4 is a block diagram comparable with FIG. 3A, illustrating the general structure of a digital bit detector 200 according to the invention. In FIG. 4, the components of the digital bit detector 200 which may be identical to those of the known digital bit detector 130 shown in FIG. 3A, are denoted by identical reference numerals. These components will hereinafter not be discussed again.

The signal input for receiving the analog read signal $S_A$ and the signal output for supplying the detected digital data signal $S_D$ are denoted by the reference numerals 201 and 202.

An important aspect of the digital bit detector 200 proposed in the present invention is a member 210 arranged between the digital A/D converter 129 and the digital equalizer 134, which member is referred to as sample-rate converter. The sample-rate converter 210 is generally capable of converting a first series of sample values $B_1$, $B_2$, $B_3$, etc. received at its input 211 and obtained by sampling a signal ($S_A$) at a first sampling frequency ($\phi_{sys}$) to a second series of sample values $I_1$, $I_2$, $I_3$, etc. of the same signal ($S_A$) and to supply this second series at its output 212 at a frequency which deviates from the frequency of the first series. The output frequency of the sample-rate converter 210 is determined by a clock signal received at its clock input 213 and here supplied by the digital oscillator 138. The sample-rate converter 210 also has an output 214 which supplies a bit-synchronous trigger signal $\phi_{bit}$ for the digital equalizer 134 and the digital difference amplifier 135.

Figure 7:
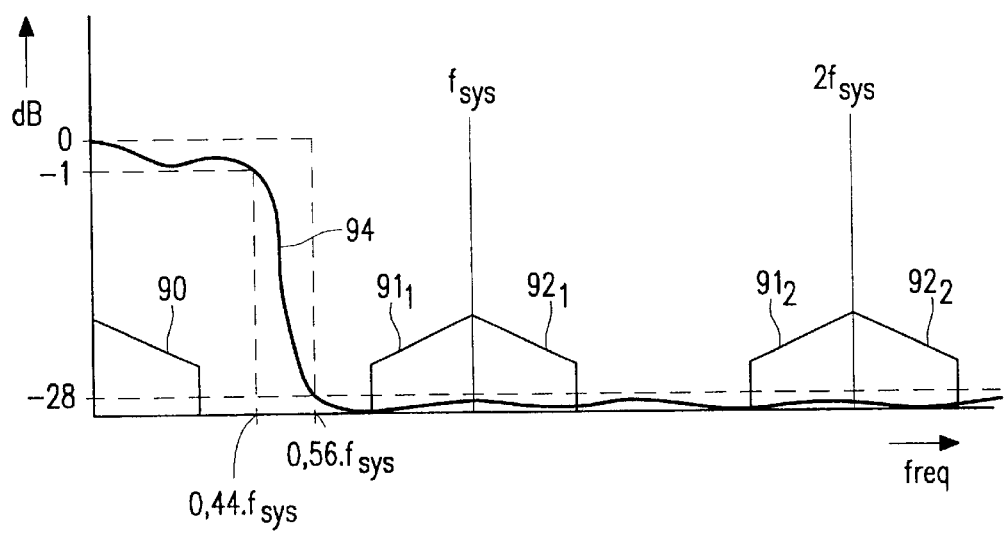
FIG. 7 shows the comparison between the frequency characteristic of a bit detector according to the invention and the frequency spectrum shown in FIG. 5.
Figure 8:
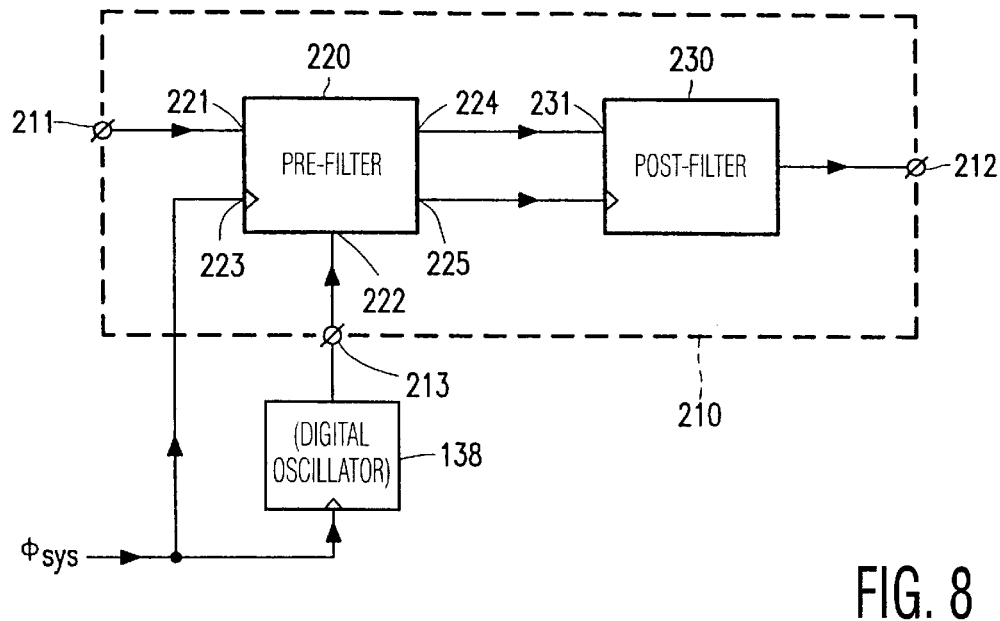
FIG. 8 is a block diagram of a bitrate converter according to the invention.

The principle of sample-rate conversion, such that the frequency characteristic shown in FIG. 7 is realized, will now be described with reference to FIGS. 8–12. The sample-rate converter 210 comprises two series-arranged filters 220 and 230 which are referred to as pre-filter and post-filter, respectively. It is to be noted that this split-up is not necessary but is preferred because the desired characteristic of the bitrate converter 210 can thereby be realized in a relatively inexpensive manner.

As will hereinafter be described in greater detail, a preferred embodiment of the pre-filter 220 is implemented as a known polyphase FIR filter ("finite impulse response filter"). The pre-filter is designed as a low-pass filter with a passband in the range between 0 and approximately $0.22.f_{bit}$, in which $f_{bit}$ represents the bit frequency of the read signal. In this passband, the attenuation is at most approximately 1 dB. Moreover, the pre-filter 220 has a stop band in the range between approximately $0.78.f_{bit}$ and finite, in which stop band the attenuation is more than approximately 28 dB.

Figure 9:
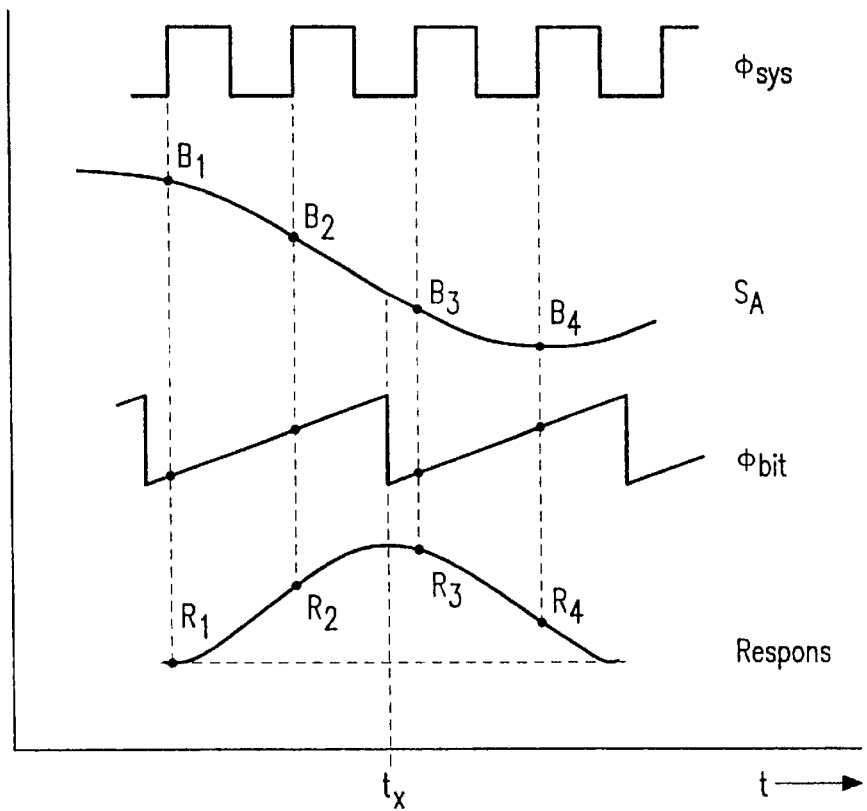
FIG. 9 illustrates the computation of an interpolation value proposed in accordance with the invention.
Figure 10:
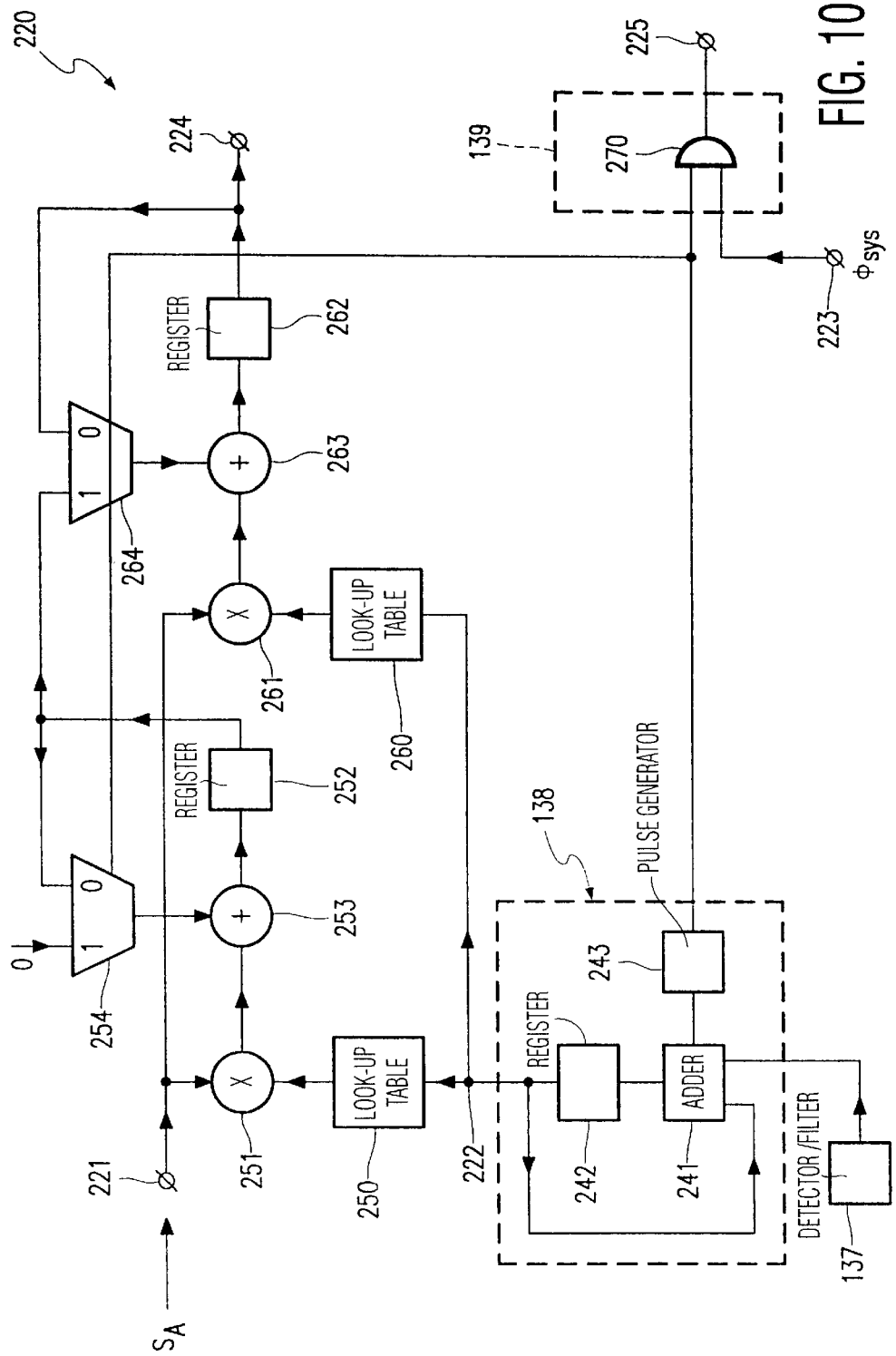
FIG. 10 is a block diagram of a pre-filter according to the invention.
Figure 11C:
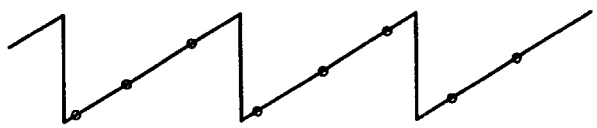
FIGS. 11A–11E shows diagrammatically some signal waveforms of the pre-filter illustrated in FIG. 10.
Figure 11F:
Figure 11G:

FIG. 9 illustrates a method proposed in accordance with the present invention for computing an interpolation value which approximates the relevant signal value better than the method described in the prior art, and FIG. 10 is a block diagram of an embodiment of the pre-filter 220 with which said computation according to the present invention is performed. FIG. 11 illustrates some signal waveforms in this pre-filter 220.

In a comparable manner as in FIG. 3E, FIG. 9 shows a part of the analog data signal $S_A$, with four measured sample values $B_1$, $B_2$, $B_3$, $B_4$ measured at trigger instants determined by the system clock signal $\phi_{sys}$ in a time interval which corresponds to twice the period of the bit clock signal $\phi_{bit}$, which time interval is centered around a sampling instant $t_x$ (phase=0) determined by the bit clock signal $\phi_{bit}$. Moreover, FIG. 9 shows a curve which represents the time-transformed function R of the pulse response of the pre-filter 220, centered around said sampling instant $t_x$, with the four response values $R_1$, $R_2$, $R_3$, $R_4$ corresponding to said trigger instants. The present invention proposes to compute an interpolation value $I_x$ for said sampling instant $t_x$ as the convolution of the analog read signal $S_A$ and the pulse response of the pre-filter 220, which, in a formula, means that:

$$I_x = B_1 R_1 + B_2 R_2 + B_3 R_3 + B_4 R_4$$

This interpolation value $I_x$ gives a better approximation of the real value $B_{23}$ of the analog read signal $S_A$ at said sampling instant to than the linear interpolation method used in the prior art.

Reference is now made to FIG. 10, in which a possible realization of the pre-filter 220 is shown with a data signal input 221 for receiving the analog data signal $S_A$, a bit oscillator signal input 222 for receiving a synchronizing signal for the digital oscillator 138, and a system clock signal input 223 for receiving the system clock signal $\phi_{sys}$.

The digital oscillator 138 is constructed in the form of an adder 241 and a register 242. A first input of the adder 241 receives said synchronizing signal from the input 222, and a second input receives the output signal from the register 242. The output signal of the adder 241 is stored in the register 242. The variation of the output signal of the register 242 thus has the shape of a sampled sawtooth, as is illustrated by curve C in FIG. 11. The adder 241 is coupled to a pulse generator 243 which generates a short pulse after each flyback of the output signal from the register 242, as is illustrated by curve F in FIG. 11.

The output signal of the register 242, i.e. the output signal of the oscillator 138 is converted on the basis of two look-up tables 250 and 260 and at instants as determined by the system clock signal $\phi_{sys}$, into corresponding values of the response R of the pre-filter 220, the first look-up table 250 representing the first part of the response and the second look-up table 260 representing the second part of the response, as illustrated by curves D and E in FIG. 11. It will be evident to those skilled in the art that it is alternatively possible to compute the corresponding response values on the basis of a formula stored in a memory, instead of using look-up tables.

The computed response values are applied to a first input of a multiplier 251, 261, respectively, which receive the analog data signal $S_A$ at another input. The result of this multiplication is added to the value already stored in a register 252, 262 via a multiplexer 254, 264 and an adder 253, 263, respectively.

Said pulse signal at the output 243 of the oscillator 138 is applied to the two multiplexers 254 and 264. In response to receiving this pulse signal, the value then present in the register 252 is added to the value in the register 262, and the value in the register 252 is reset to zero. Now, there is a valid result of the computation at the output of the register 262, which value is passed on to a result output 224 of the pre-filter 220. The presence of a valid result at the result output 224 is indicated by a gated clock signal at a validity output 225 of the pre-filter 220. The gated clock signal is supplied by an AND gate 270 which receives the pulse signal from the output 243 of the oscillator 138 at a first input, and the system clock signal $\phi_{sys}$ at a second input. The gated clock signal is shown at curve G in FIG. 11.

Figure 12:
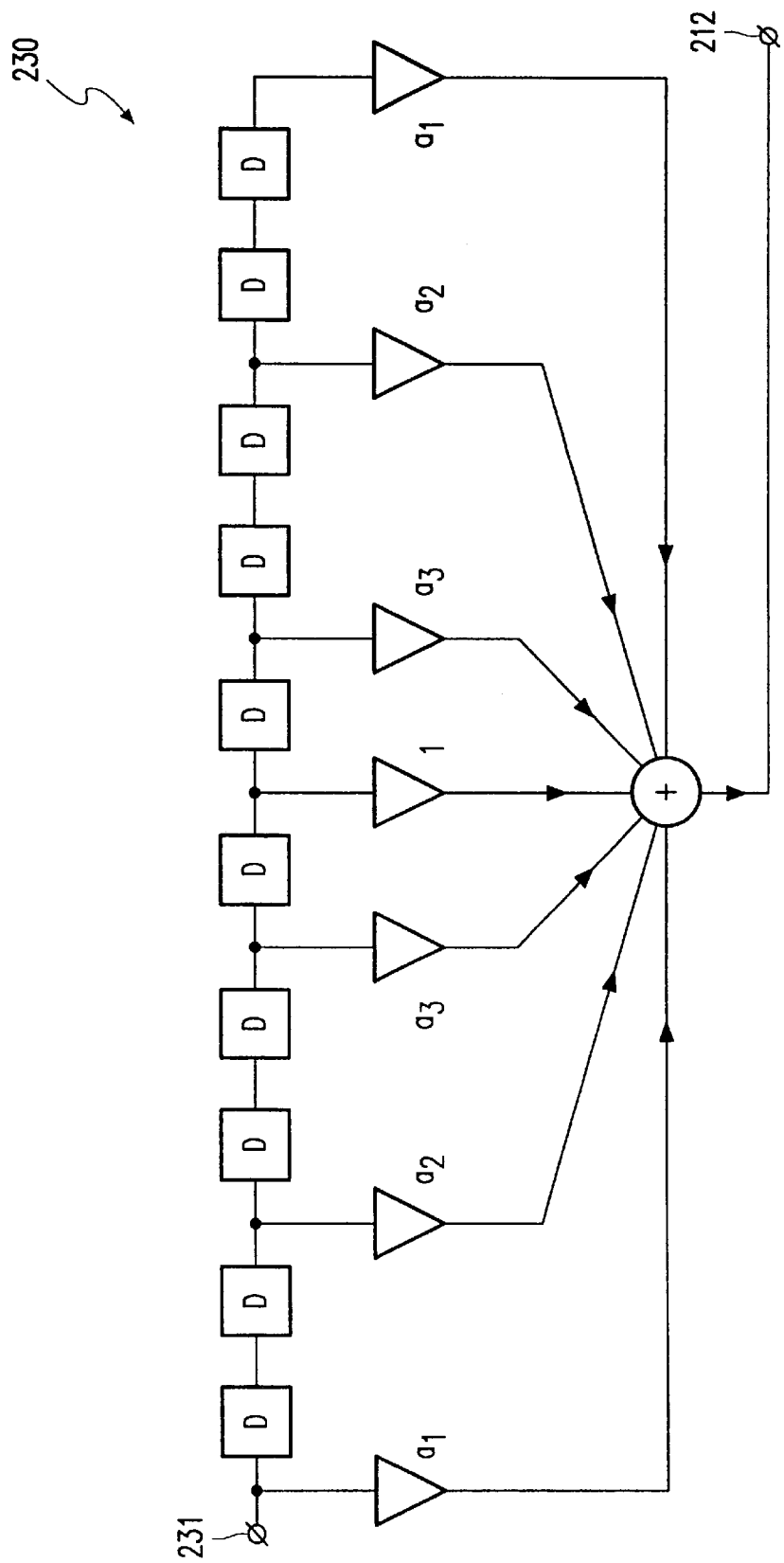
FIG. 12 is a block diagram of a post-filter according to the invention.

FIG. 12 is a block diagram of a preferred embodiment of the post-filter 230 which is implemented in this embodiment as a known bireciprocal FIR filter having a symmetrical structure. The post-filter is designed as a low-pass filter, with a passband in the range between 0 and approximately $0.22.f_{bit}$ and a stop band in the range between approximately $0.28.f_{bit}$ and approximately $0.5.f_{bit}$. In the passband, the attenuation is at most approximately 1 dB. In the stop band, the attenuation is minimally 28 dB. The input 231 of the post-filter 230 receives the output signal from the result output 224 of the pre-filter 220. The post-filter receives, as a clock signal, the gated clock signal from the validity output 225 of the pre-filter 220.

Figure 13:
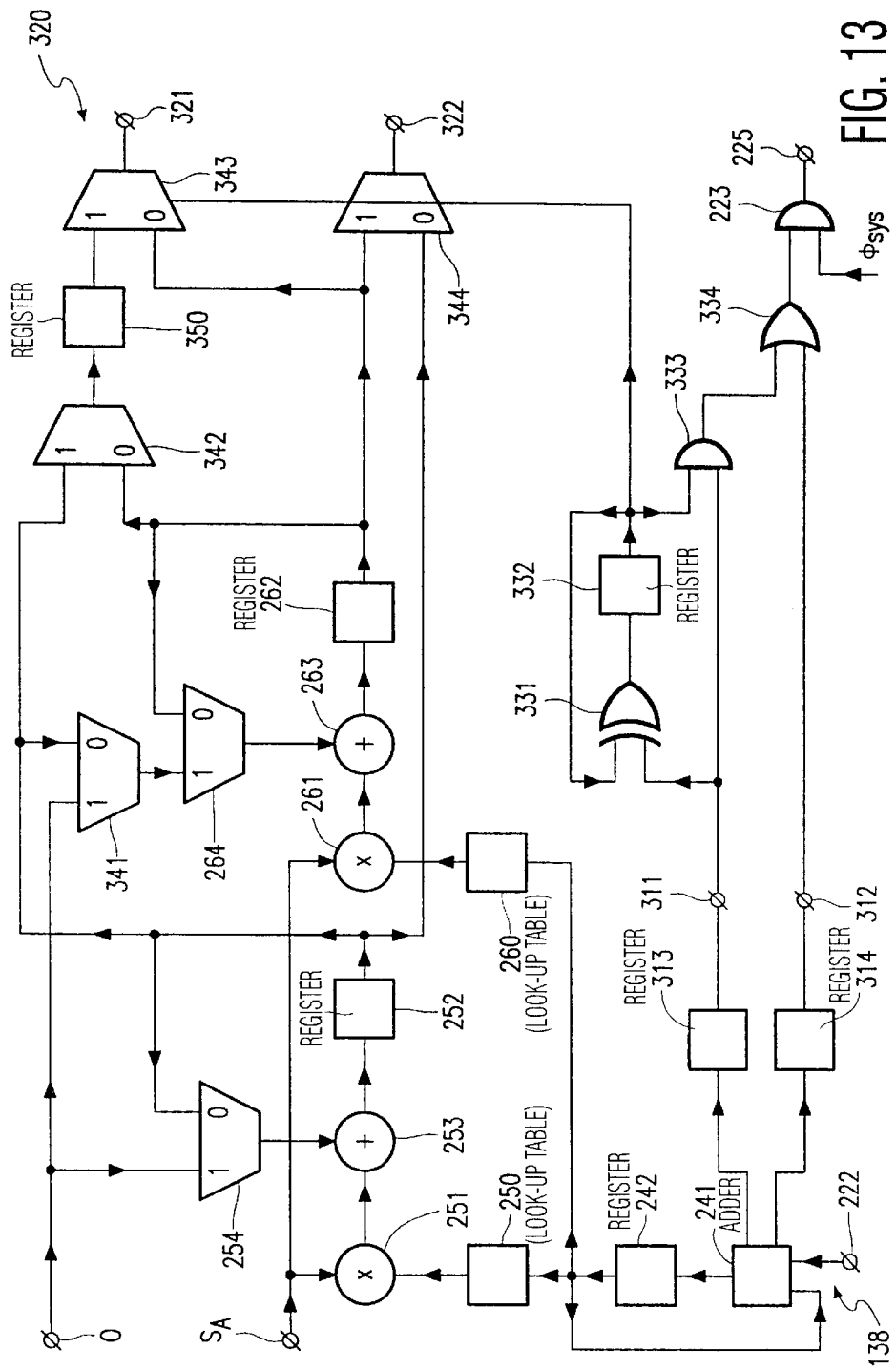
FIG. 13 is a block diagram, comparable to that in FIG. 10, of an alternative embodiment of a pre-filter according to the invention.
Figure 14:
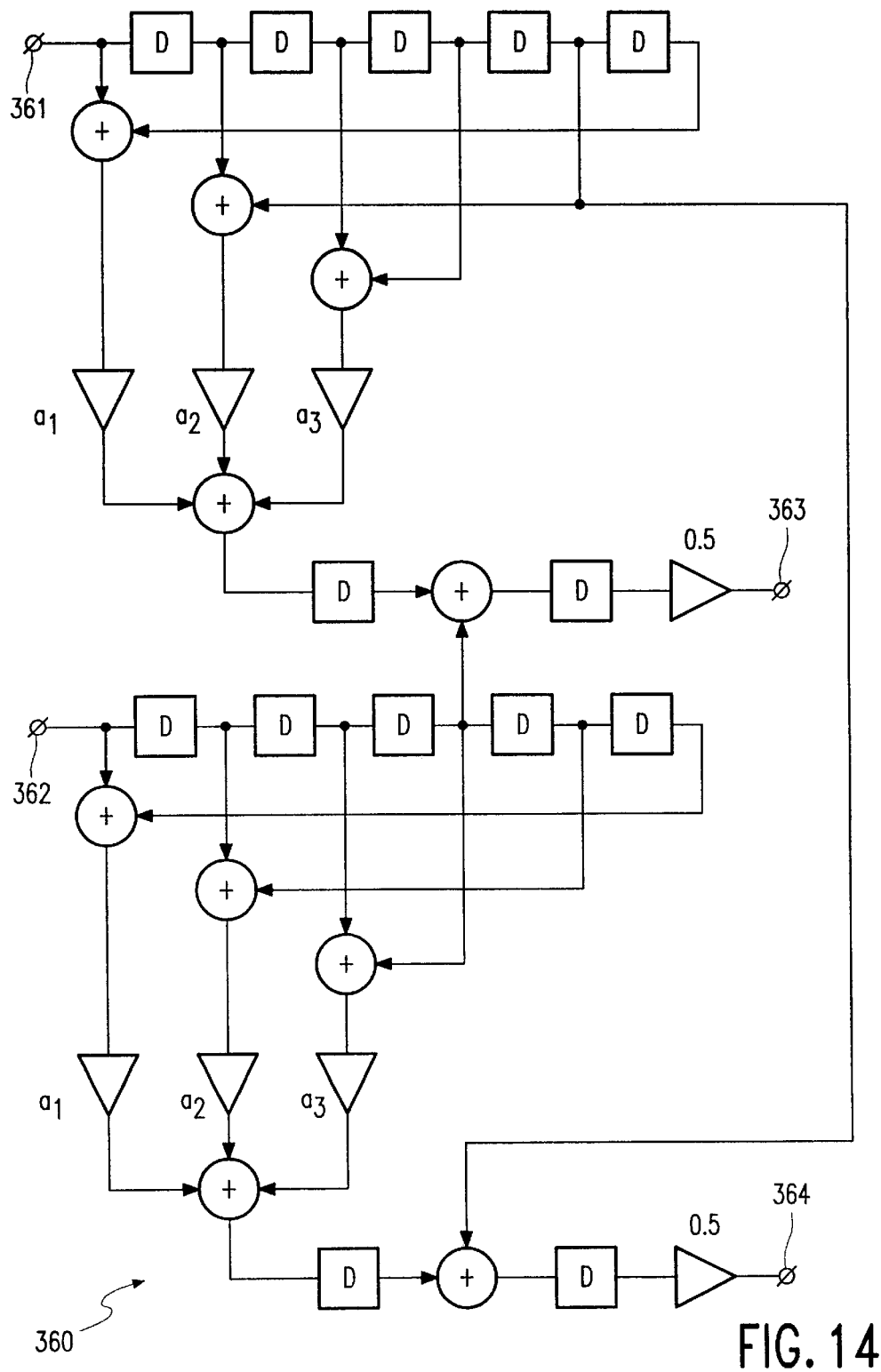
FIG. 14 is a block diagram, comparable to that in FIG. 12, of an alternative embodiment of a post-filter according to the invention.

The embodiment described hereinbefore with reference to FIGS. 4 and 8–12 already yields an improvement with respect to the prior art due to the improved accuracy of the interpolation value. Moreover, the algorithm used has a characteristic which allows use of this algorithm in the range up to twice the system frequency. The embodiment described is, however, not usable up to such a high frequency. With reference to FIGS. 13 and 14, a bit detector 300 will now be described in which the previously described algorithm is used but has the extra advantage in an implementation that the frequency of the system clock may be smaller than the bit frequency of the read signal. Reference numerals which are identical in FIG. 10 denote identical components which will not be further described again.

The bit detector 300 has a pre-filter 320 with two result outputs 321, 322 and a single validity output 225. Whenever a pulse of the validity signal is present at the validity output 225, a sample is available at each of the result outputs 321, 322. Thus two signal values become available simultaneously per validity pulse. These two values must be processed in their correct sequence by a subsequent signal-processing member such as the member 20 in FIG. 1B. A value which is to be processed at an earlier stage will be denoted by the term "early", while the other value will be denoted by the term "late".

The oscillator 138 has two pulse outputs 311 and 312. The first output 311 is constituted by a register 313 and the second output 312 is constituted by a register 314 whose respective inputs receive the first and the second carry bit, respectively, from the adder 241. These carry bits represent modulo passages of the adder 241. Normally, the levels at these outputs are LOW. If the oscillator 138 has a single flyback in the period between two system clock pulses, the level of the first pulse output 311 is HIGH, whereas the second pulse output 312 remains LOW. If the oscillator 138 has two flybacks in the period between two system clock pulses, the level of the first pulse output 311 is LOW, whereas the second pulse output 312 is HIGH. If the oscillator 138 has had no flyback at all in the period between two system clock pulses, the level of both the first pulse output 311 and the second pulse output 312 has remained LOW.

The first pulse output 311 is connected to a first input of an EX-OR gate 331 and to a first input of an AND gate 333. The output of the EX-OR gate 331 is connected via a register 332 to a second input of the EX-OR gate 331 and to a second input of the AND gate 333. The output of the AND gate 333 is connected to a first input of an OR gate 334. The second pulse output 312 is connected to a second input of the OR gate 334. A second AND gate 223 has a first input, which is coupled to receive the system clock signal $\phi_{sys}$, and a second input which is coupled to the output of the OR gate 334.

A validity pulse is generated once per two flybacks of the oscillator 138 by the validity pulse generator consisting of the members 223, 331, 332, 333 and 334.

If the oscillator 138 has had a single flyback in the period between two system clock pulses, the level of the first pulse output 311 is HIGH, whereas the second pulse output 312 remains LOW. If the content of the register 332 is "0", the content of the register 332 is rendered equal to "1" and no validity pulse is supplied from the validity output 225, whereas the content of the register 332 is rendered equal to "0" if the content of the register 332 is "1", and a validity pulse is supplied from the validity output 225.

If the oscillator 138 has had two flybacks in the period between two system clock pulses, the content of the register 332 is not changed and a validity pulse is supplied from the validity output 225.

As compared with the pre-filter 220 of FIG. 10, the pre-filter 320 of FIG. 13 comprises four additional multiplexers 341, 342, 343 and 344 and an additional register 350. If the register 332 comprises the value "1", this implies that, up to that instant, the pre-filter 320 has generated one bit value more than it has supplied from the result outputs 321 and 322. This bit value is stored in the additional register 350 and is thus valid as an "early" bit at the next validity pulse, whereas the first value of the pre-filter is then valid as a "late" bit.

If the register 332 comprises the value "0", the first value of the pre-filter is valid as an "early" bit at the next validity pulse, whereas the second value of the pre-filter is then valid as a "late" bit. If the pre-filter supplies at least one value (output 311 is HIGH), the last value of the pre-filter is written in the additional register 350. If two flybacks of the oscillator 138 occur, this relates to the content of the register 252, and otherwise this relates to the content of the register 262.

FIG. 14 is a block diagram, comparable to FIG. 12, of the post-filter 360 of the bitrate converter 300, which post-filter 360 has two parallel data paths which are implemented symmetrically. More particularly, the post-filter 360 has two result inputs 361 and 362 for coupling to the result outputs 321 and 322, respectively, of the pre-filter 320, and two data outputs 363 and 364.

In summary, the present invention provides a method and device for detecting bits in a read signal from a CD, which read signal is sampled with a system clock frequency which deviates from the bit frequency. A series of bit-frequency relevant signal values ($B_{12}$) is computed from the series of system clock frequency-measured sample values ($B_1$, $B_2$, . . . ) as a convolution of the measured sample values with a function centered around the desired sampling instant, which function is the Fourier transform of a predetermined pulse response of the sampling procedure.

This pulse response is chosen to be such that the sampling procedure is reliable for bit frequencies up to twice the system clock frequency.

To be able to process such high bit frequencies in actual practice, a bit detector 320 according to the invention has two data outputs 321, 322 and one validity output 225. Whenever a computation has been finished, the validity output supplies a pulse whose frequency may be maximally equal to the system clock frequency. Per validity pulse, the bit detector can supply two sample values simultaneously at its two data outputs.

An important advantage of the approach used in the method according to the invention is that the quality of the filter, as expressed by its frequency characteristic, may be arbitrarily good, with the characteristic desired by the designer becoming manifest in the Fourier-transformed function R thereof. Thus it is possible to optimally adapt the filter to a specific application.

Another important advantage is that the bandwidth of the filter is related to the bit clock frequency; more particularly, the bandwidth is equal to $0.25.f_{bit}$. This implies that the characteristic of the filter adapts to the bit clock and that all noise in the signal is suppressed by the bit clock.

It will be evident to those skilled in the art that the protective scope of the present invention as defined by the claims is not limited to the described embodiments shown in the drawings, but that it is possible to change or modify the shown embodiments of the digital bit detector according to the invention within the scope of the present invention. For example, it is possible to store the digital information in the form of bits which may assume three or more logic values. Moreover, the bit frequency may be more than twice as large as the frequency of the system clock by way of a parallel configuration of several processing paths in the bit detector.

Furthermore, an implementation is possible in which the difference generator 135 is an analog difference generator. The difference generator 135 may be alternatively arranged at a different position in the circuit, for example directly at the input 201 and preceding the filters $133_1$, $133_2$,

What is claimed is:

1. A sample-rate converter, comprising:
   a signal input for receiving a series of sample values of a read signal at a sampling frequency;
   an oscillator input for receiving a bit-frequency oscillator signal;
   a signal output for supplying a series of interpolation values which have a frequency corresponding to the clock signal;

transform means which are coupled to the oscillator input to supply a value of the function which is the Fourier transform of a predetermined desired pulse response characteristic depending on the phase of the oscillator signal;

multipliers, a first input of which is coupled to the signal input, and a second input of which is coupled to a respective one of the transform means;

means for adding numbers supplied by the multipliers through a phase period of the oscillator signal, and means for supplying a gated clock signal.

2. The sample-rate converter of claim 1, wherein the transform means are storage means in which look-up tables are stored.

3. The sample-rate converter of claim 1, wherein:

the means for adding numbers supplied by the multipliers through a phase period of the oscillator signal includes;

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer and to the one-input of the second multiplexer;

the one-input of the first multiplexer being connected to zero, and the output of the second register being connected to the zero-input of the second multiplexer.

4. The sample-rate converter of claim 1, wherein the means for supplying a gated clock signal include an AND gate, a first input of which is coupled to receive the system clock signal and a second input of which is coupled to an output of the oscillator.

5. The sample-rate converter of claim 1, wherein:

the means for adding numbers supplied by the multipliers through a phase period of the oscillator signal include:

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer, to the zero-input of a third multiplexer, to the one-input of a fourth multiplexer, and to the zero-input of a fifth multiplexer;

the one-input of the first multiplexer being connected to zero;

the one-input of the third multiplexer being connected to zero;

the output of the second register being connected to the zero-input of the second multiplexer, to the zero-input of the fourth multiplexer, to the one-input of the fifth multiplexer, and to the zero-input of a sixth multiplexer;

the one-input of the second multiplexer being connected to the output of the third multiplexer;

the output of the fourth multiplexer being connected to an input of an additional register whose output is connected to the one-input of the sixth multiplexer; and the output of the sixth multiplexer being connected, preferably via a post-filter, to an "early" output of the sample-rate converter, and the output of the fifth multiplexer being connected, preferably also via the post-filter, to a "late" output of the sample-rate converter.

6. The sample-rate converter of claim 5, wherein the means for supplying a gated clock signal include:

an EX-OR gate, a first input of which is connected to a first output of the oscillator, and a second input is connected to the output of a register, whose input is connected to the output of the EX-OR gate;

a first AND gate, a first input of which is connected to the first output of the oscillator, and a second input is connected to the output of the register;

an OR gate, a first input of which is connected to the output of the first AND gate, and a second input is connected to a second output of the oscillator; and a second AND gate, a first input of which is coupled to receive the system clock signal, and a second input of which is coupled to the output of the OR gate.

7. The sample-rate converter of claim 1, used at the front end of an optical disc.

8. The sample-rate converter of claim 1, wherein the output of the second register also being connected via a post-filter, to the output of the sample-rate converter.

9. The sample-rate converter of claim 1, wherein:

the transform means are storage means in which look-up tables are stored;

the sample-rate converter is used at the front end of an optical disc;

the means for adding numbers supplied by the multipliers through a phase period of the oscillator signal includes:

a first adder, a first input of which is connected to the output of a first multiplier, a second input is connected to the output of a first multiplexer, and the output is connected to the input of a first register;

a second adder, a first input of which is connected to the output of a second multiplier, a second input is connected to the output of a second multiplexer, and the output is connected to the input of a second register;

the output of the first register being connected to the zero-input of the first multiplexer and to the one-input of the second multiplexer;

the one-input of the first multiplexer being connected to zero, and the output of the second register being connected to the zero-input of the second multiplexer;

the output of the second register also being connected via a post-filter, to the output of the sample-rate converter; and the means for supplying a gated clock signal include an AND gate, a first input of which is coupled to receive the system clock signal and a second input of which is coupled to an output of the oscillator.

10. The sample-rate converter of claim 1, wherein:

the transform means are storage means in which look-up tables are stored;

the sample-rate converter is used at the front end of an optical disc;

the means for adding numbers supplied by the multipliers through a phase period of the oscillator signal include:

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer, to the zero-input of a third multiplexer, to the one-input of a fourth multiplexer, and to the zero-input of a fifth multiplexer;

the one-input of the first multiplexer being connected to zero;

the one-input of the third multiplexer being connected to zero;

the output of the second register being connected to the zero-input of the second multiplexer, to the zero-input of the fourth multiplexer, to the one-input of the fifth multiplexer, and to the zero-input of a sixth multiplexer;

the one-input of the second multiplexer being connected to the output of the third multiplexer;

the output of the fourth multiplexer being connected to an input of an additional register whose output is connected to the one-input of the sixth multiplexer;

the output of the sixth multiplexer being connected, preferably via a post-filter, to an "early" output of the sample-rate converter, and the output of the fifth multiplexer being connected, preferably also via the post-filter, to a "late" output of the sample-rate converter; and the means for supplying a gated clock signal include:

an EX-OR gate, a first input of which is connected to a first output of the oscillator, and a second input is connected to the output of a register, whose input is connected to the output of the EX-OR gate;

a first AND gate, a first input of which is connected to the first output of the oscillator, and a second input is connected to the output of the register;

an OR gate, a first input of which is connected to the output of the first AND gate, and a second input is connected to a second output of the oscillator; and a second AND gate, a first input of which is coupled to receive the system clock signal, and a second input of which is coupled to the output of the OR gate.

11. A digital bit detector for converting an analog read signal into a digital data signal, comprising:

an input for receiving the analog read signal;

a clock input for receiving a system clock signal;

an A/D converter which is coupled, preferably via filters, to the input and which is clocked with the system clock signal;

oscillator means for supplying a periodical oscillator signal having a phase which is indicative of desired, bit-synchronous sampling instants; and a sample-rate converter, including:

a signal input coupled to the output of the A/D converter and for receiving a series of sample values of a read signal at a sampling frequency;

an oscillator input for receiving a bit-frequency oscillator signal;

a signal output means coupled to the output of the oscillator means and for supplying a series of interpolation values which have a frequency corresponding to the clock signal;

transform means which are coupled to the oscillator input to supply a value of the function which is the Fourier transform of a predetermined desired pulse response characteristic depending on the phase of the oscillator signal;

multipliers, a first input of which is coupled to the signal input, and a second input of which is coupled to a respective one of the transform means;

means for adding numbers supplied by the multipliers through a phase period of the oscillator signal, and means for supplying a gated clock signal.

12. The digital bit detector of claim 11, wherein the filters of the sample-rate converter operate as the bit clock, and the bandwidth of the sample-rate converter is proportional to the bit clock frequency.

13. The bit detector of claim 11, wherein:

the transform means ate storage means in which look-up tables are stored;

the sample-rate converter is used at the front end of an optical disc;

the filters of the sample-rate converter operate as the bit clock, and the bandwidth of the sample-rate converter is proportional to the bit clock frequency;

the means for adding numbers supplied by the multipliers through a phase period of the oscillator signal includes:

a first adder, a first input of which is connected to the output of a first multiplier, a second input is connected to the output of a first multiplexer, and the output is connected to the input of a first register;

a second adder, a first input of which is connected to the output of a second multiplier, a second input is connected to the output of a second multiplexer, and the output is connected to the input of a second register;

the output of the first register being connected to the zero-input of the first multiplexer and to the one-input of the second multiplexer;

the one-input of the first multiplexer being connected to zero, and the output of the second register being connected to the zero-input of the second multiplexer;

the output of the second register also being connected via a post-filter, to the output of the sample-rate converter; and the means for supplying a gated clock signal include an AND gate, a first input of which is coupled to receive the system clock signal and a second input of which is coupled to an output of the oscillator.

14. The bit detector of claim 11, wherein:

the transform means are storage means in which look-up tables are stored;

the sample-rate converter is used at the front end of an optical disc;

the filters of the sample-rate converter operate as the bit clock, and the bandwidth of the sample-rate converter is proportional to the bit clock frequency;

the means for adding numbers supplied by the multipliers through a phase period of the oscillator signal include:

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer, to the zero-input of a third multiplexer, to the one-input of a fourth multiplexer, and to the zero-input of a fifth multiplexer;

the one-input of the first multiplexer being connected to zero;

the one-input of the third multiplexer being connected to zero;

the output of the second register being connected to the zero-input of the second multiplexer, to the zero-input of the fourth multiplexer, to the one-input of the fifth multiplexer, and to the zero-input of a sixth multiplexer;

the one-input of the second multiplexer being connected to the output of the third multiplexer;

the output of the fourth multiplexer being connected to an input of an additional register whose output is connected to the one-input of the sixth multiplexer;

the output of the sixth multiplexer being connected, preferably via a post-filter, to an "early" output of the sample-rate converter, and the output of the fifth multiplexer being connected, preferably also via the post-filter, to a "late" output of the sample-rate converter; and the means for supplying a gated clock signal include:

an EX-OR gate, a first input of which is connected to a first output of the oscillator, and a second input is connected to the output of a register, whose input is connected to the output of the EX-OR gate;

a first AND gate, a first input of which is connected to the first output of the oscillator, and a second input is connected to the output of the register;

an on gate, a first input of which is connected to the output of the first AND gate, and a second input is connected to a second output of the oscillator; and a second AND gate, a first input of which is coupled to receive the system clock signal, and a second input of which is coupled to the output of the OR gate.

15. A device for reading information recorded on an optical disc, comprising:

optical means for scanning the disc and supplying an optical signal which is representative of the information read;

opto-electric means for supplying an electric signal which is representative of the optical signal;

a system clock generator for supplying a system clock signal;

digital bit detector means for converting an analog read signal into a digital data signal, including:

an input for receiving the analog read signal;

a clock input coupled to the output of the system clock generator for receiving the system clock signal;

an A/D converter which is coupled, preferably via filters, to the input and which is clocked with the system clock signal;

oscillator means for supplying a periodical oscillator signal having a phase which is indicative of desired, bit-synchronous sampling instants; and a sample-rate converter, including:

signal input means coupled to the output of the A/D converter and coupled to the output of the opto-electric means and for receiving a series of sample values of a read signal at a sampling frequency;

an oscillator input for receiving a bit-frequency oscillator signal;

a signal output means coupled to the output of the oscillator means and for supplying a series of interpolation values which have a frequency corresponding to the clock signal;

transform means which are coupled to the oscillator input to supply a value of the function which is the Fourier transform of a predetermined desired pulse response characteristic depending on the phase of the oscillator signal;

multipliers, a first input of which is coupled to the signal input, and a second input of which is coupled to a respective one of the transform means;

means for adding numbers supplied by the multipliers through a phase period of the oscillator signal, and means for supplying a gated clock signal.

16. The device of claim 15, wherein:

the transform means are storage means in which look-up tables are stored;

the sample-rate converter is used at the front end of an optical disc;

the means for adding numbers supplied by the multipliers through a phase period of the oscillator signal includes:

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer and to the one-input of the second multiplexer;

the one-input of the first multiplexer being connected to zero, and the output of the second register being connected to the zero-input of the second multiplexer;

the output of the second register also being connected via a post-filter, to the output of the sample-rate converter; and the means for supplying a gated clock signal include an AND gate, a first input of which is coupled to receive the system clock signal and a second input of which is coupled to an output of the oscillator.

17. The device of claim 15, wherein:

the transform means are storage means in which look-up tables are stored;

the sample-rate converter is used at the front end of an optical disc;

the means for adding numbers supplied by the multipliers through a phase period of the oscillator signal include:

a first adder, a first input of which is connected to the output of a first multiplier, a second input is connected to the output of a first multiplexer, and the output is connected to the input of a first register; and a second adder, a first input of which is connected to the output of a second multiplier, a second input is connected to the output of a second multiplexer, and the output is connected to the input of a second register;

the output of the first register being connected to the zero-input of the first multiplexer, to the zero-input of a third multiplexer, to the one-input of a fourth multiplexer, and to the zero-input of a fifth multiplexer;

the one-input of the first multiplexer being connected to zero;

the one-input of the third multiplexer being connected to zero;

the output of the second register being connected to the zero-input of the second multiplexer, to the zero-input of the fourth multiplexer, to the one-input of the fifth multiplexer, and to the zero-input of a sixth multiplexer;

the one-input of the second multiplexer being connected to the output of the third multiplexer;

the output of the fourth multiplexer being connected to an input of an additional register whose output is connected to the one-input of the sixth multiplexer;

the output of the sixth multiplexer being connected, preferably via a post-filter, to an "early" output of the sample-rate converter, and the output of the fifth multiplexer being connected, preferably also via the post-filter, to a "late" output of the sample-rate converter; and the means for supplying a gated clock signal include:

an EX-OR gate, a first input of which is connected to a first output of the oscillator, and a second input is connected to the output of a register, whose input is connected to the output of the EX-OR gate;

a first AND gate, a first input of which is connected to the first output of the oscillator, and a second input is connected to the output of the register;

an OR gate, a first input of which is connected to the output of the first AND gate, and a second input is connected to a second output of the oscillator; and a second AND gate, a first input of which is coupled to receive the system clock signal, and a second input of which is coupled to the output of the OR gate.

* * * * *